April 21, 1964 P. B. GREENE 3,129,491
STATOR WINDING MACHINE MEANS
Filed Feb. 29, 1960 8 Sheets-Sheet 1

INVENTOR.
PAUL B. GREENE
BY Albert H. Reuther
HIS ATTORNEY

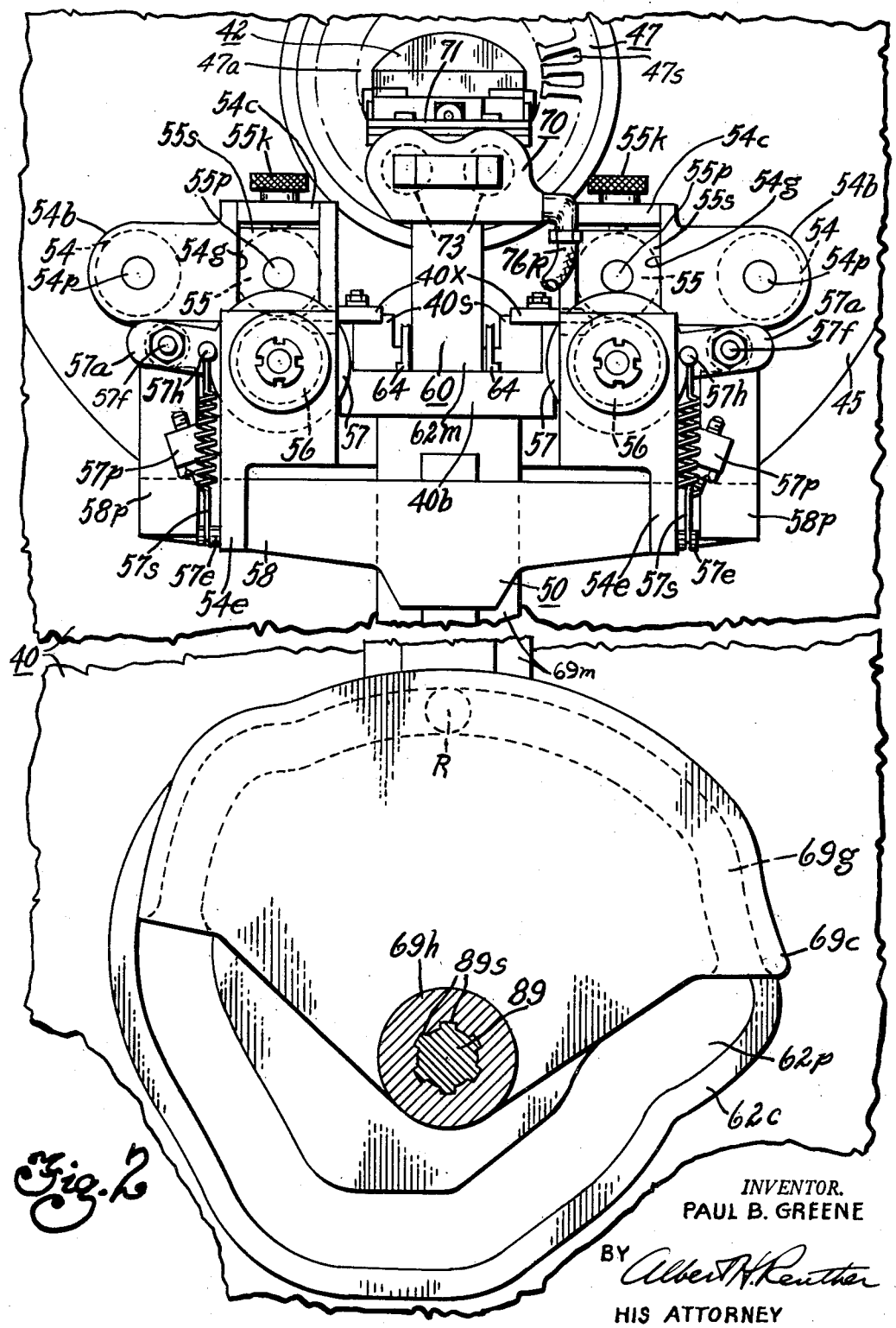

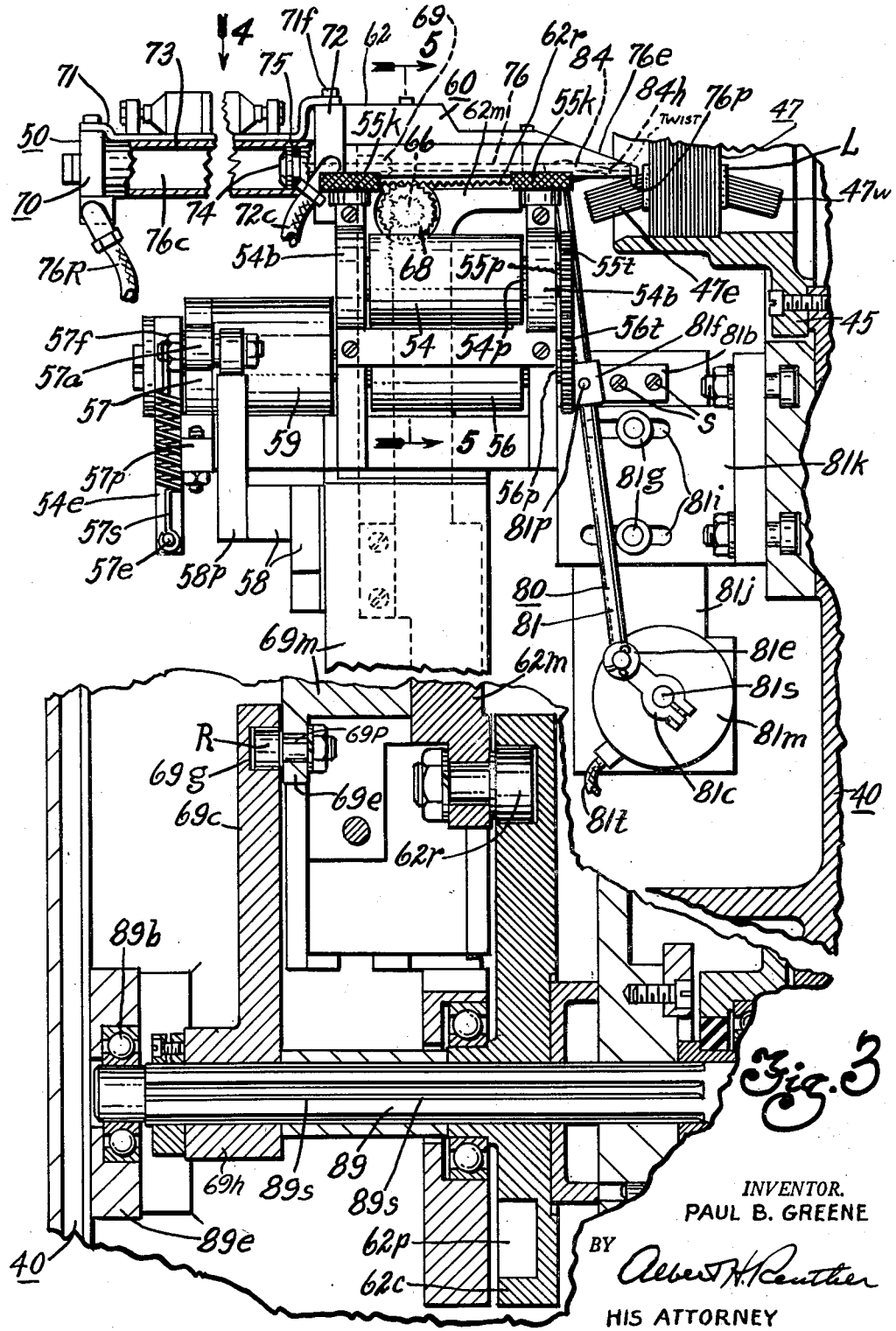

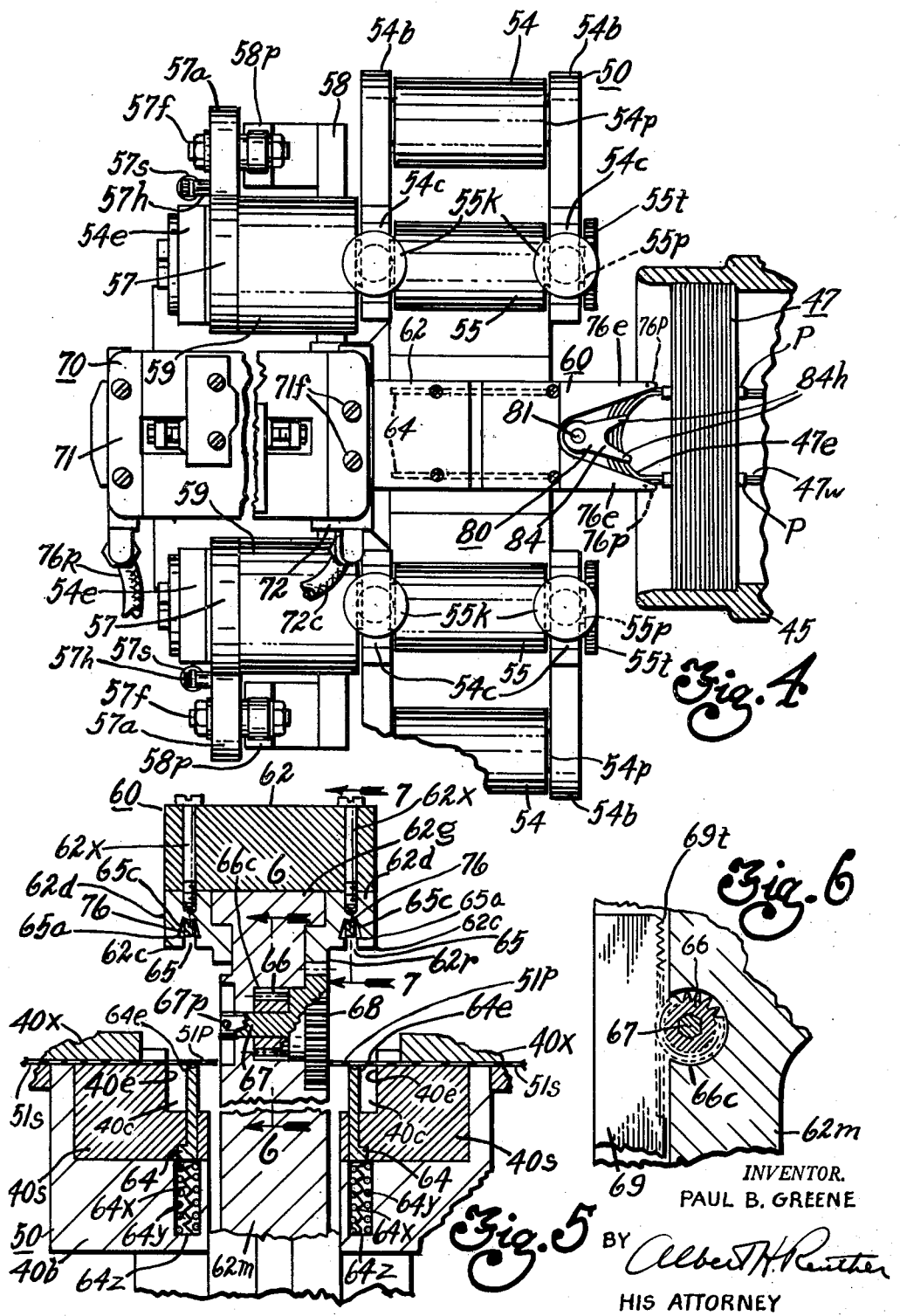

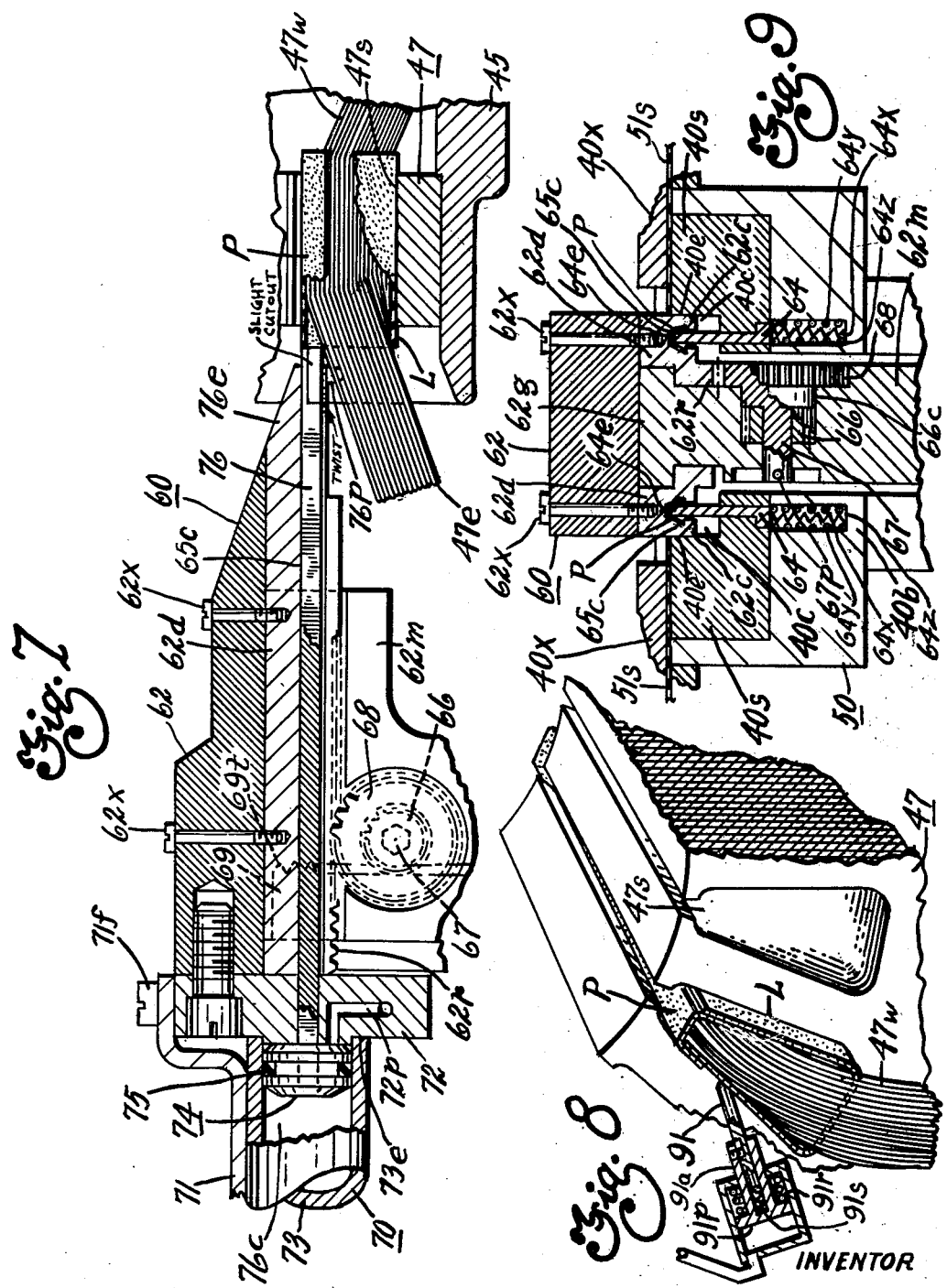

April 21, 1964 P. B. GREENE 3,129,491
STATOR WINDING MACHINE MEANS
Filed Feb. 29, 1960 8 Sheets-Sheet 6
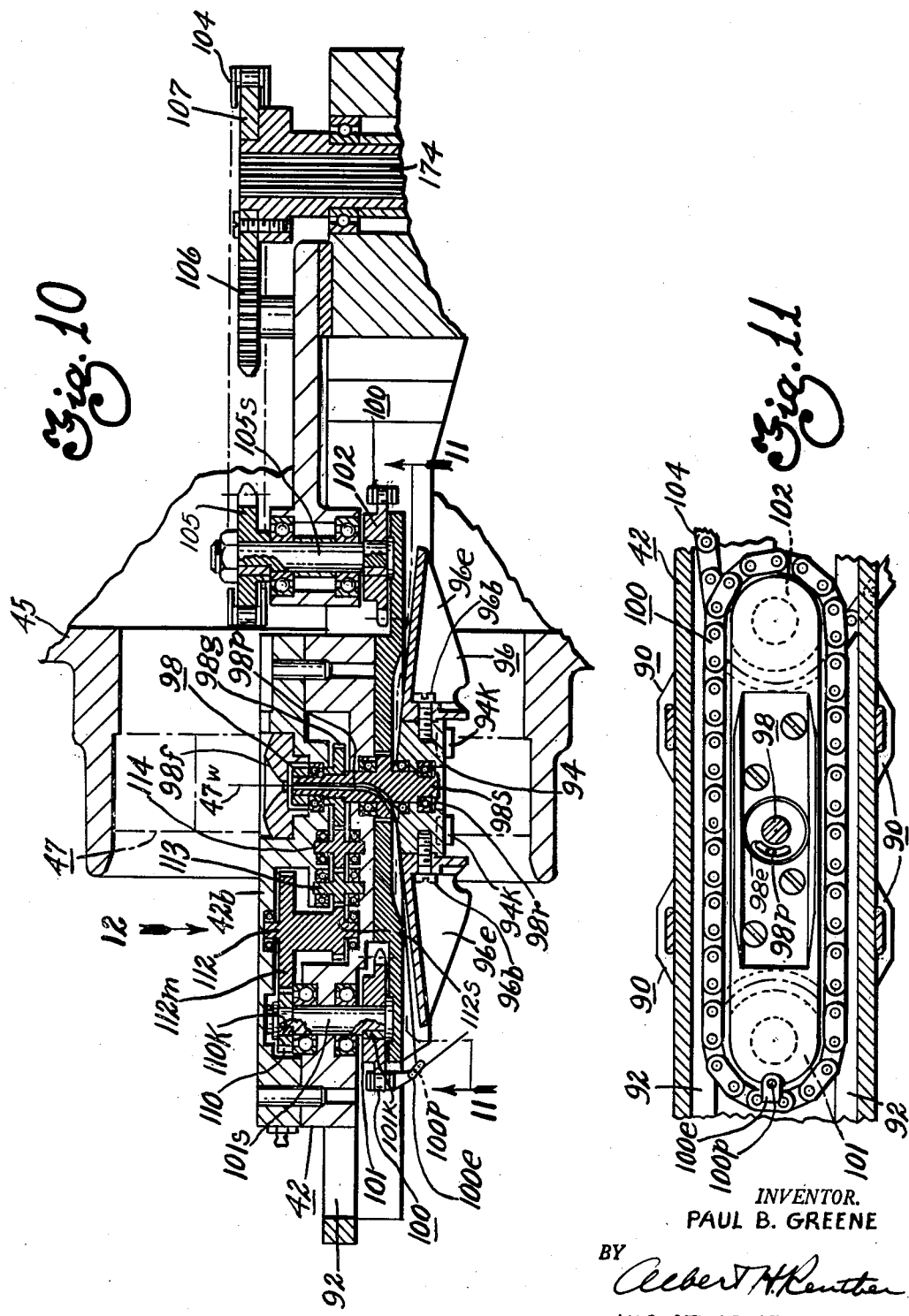
INVENTOR.
PAUL B. GREENE
BY Albert H. Reuther
HIS ATTORNEY

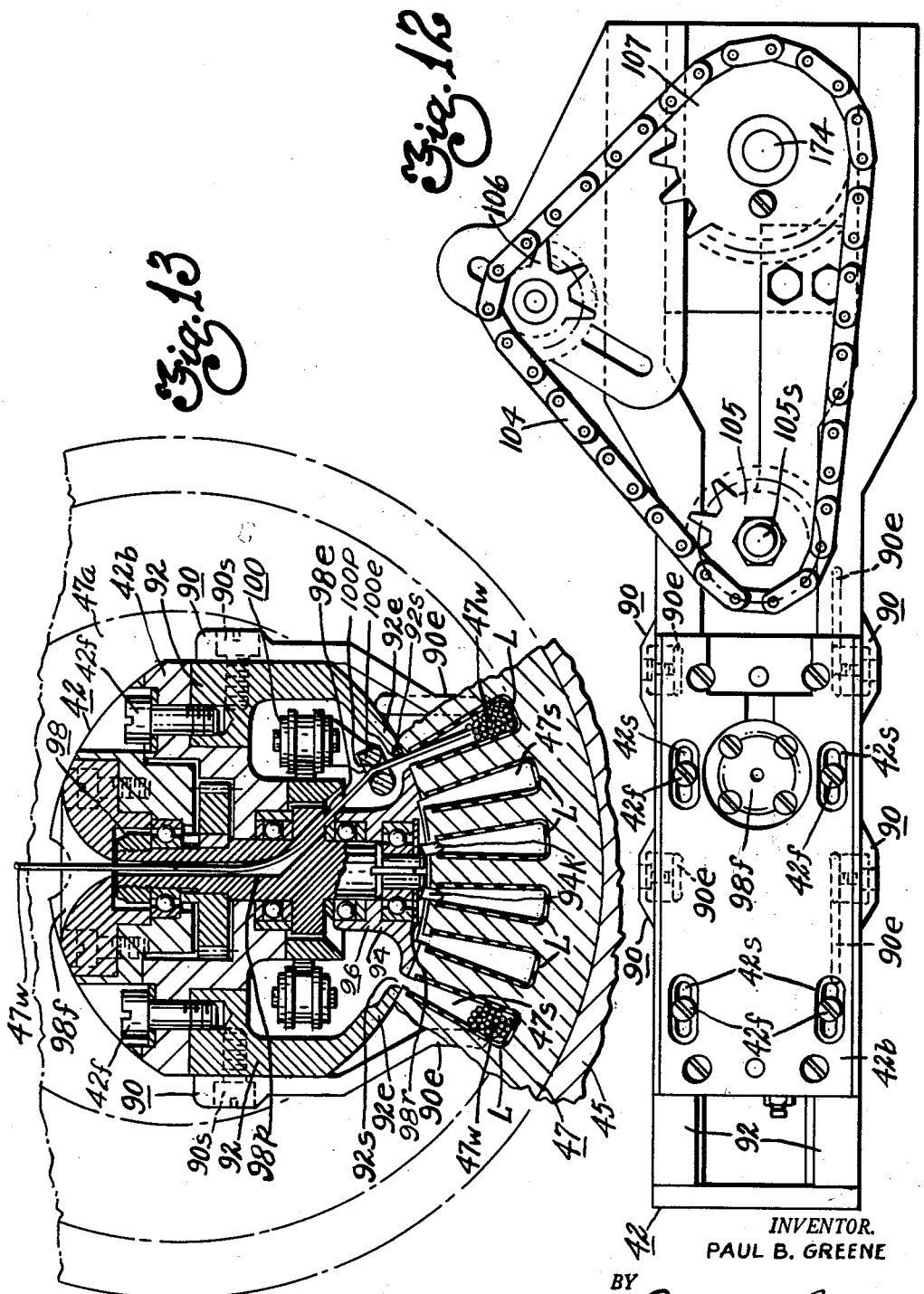

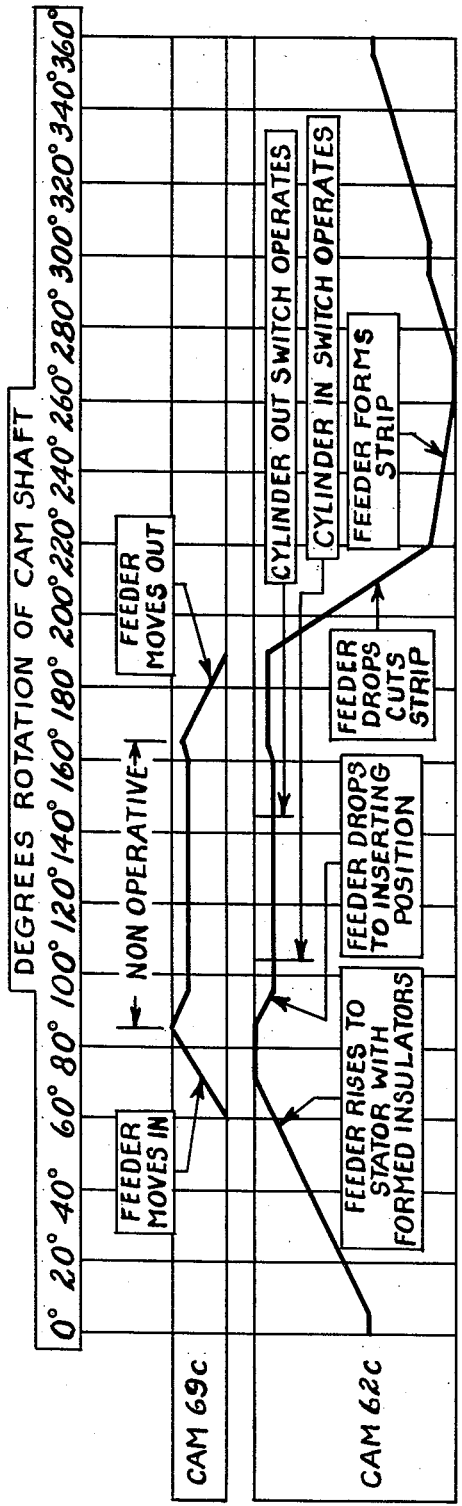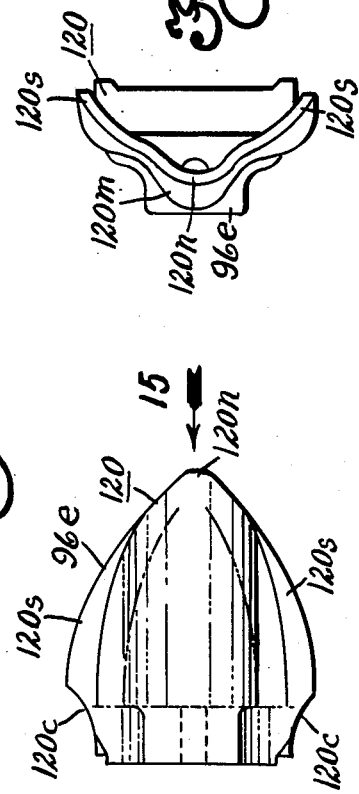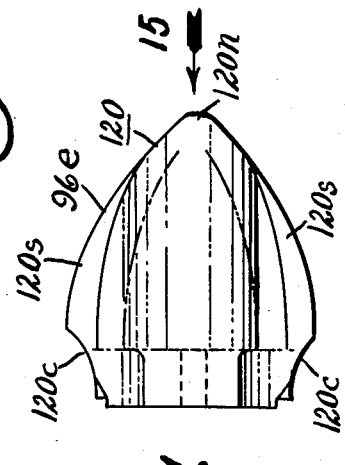

United States Patent Office 3,129,491
Patented Apr. 21, 1964

3,129,491
STATOR WINDING MACHINE MEANS
Paul B. Greene, Miamisburg, Ohio, assignor to General Motors Corporation, Detroit, Mich., a corporation of Delaware
Filed Feb. 29, 1960, Ser. No. 11,654
10 Claims. (Cl. 29—33)

This invention relates to the manufacture of dynamoelectric machines or any other device having a slotted structure relative to which conducting material is fitted as coils formed and insulated relative thereto, and particularly, to a stator winding machine means adapted for accurately winding and/or insulating conducting material as coils relative to a slotted structure.

An object of this invention is to provide a new and improved stator coil winding machine means adapted to operate efficiently in placement of material relative to stator slots filled automatically and progressively for mass production purposes.

Another object of this invention is to provide a stator winding machine means having mechanism for feeding slot closure means, pegging and the like into a machine-wound stator immediately in conjunction with winding of wire coils into predetermined groups at least a portion of which are temporarily engaged to avoid shifting thereof during insertion and closing of the slots.

Another object of this invention is to provide a stator winding machine means having mechanism to feed insulating material in a continuous strip of paper and the like severable into slot-closing peg portions which are automatically forwarded in pairs by cam-controlled insertion means in steps including winding of a coil into a pair of stator slots positioned adjacent to a winding head portion having a gear-driven chain therewith also gear-connected directly to a centrally journalled snorkel member through which coil wire is fed and guided to stator slots also by shoe means held to the winding head portion only by said geared snorkel member as well as adapted to be positioned adjustably and longitudinally relative to the winding head portion, then a rod-like hooked-end "woodpecker" means being operated to hold end turns of the wound wire coil against shifting relative to slot liners of insulating material which is generally channel shaped and optionally dislocated laterally such that U-shaped slot-closure peg portions are forced longitudinally into slots with one side thereof between the slot liner and slot periphery and with an opposite side thereof between the wound wire coil and an inner periphery of a slot liner, pairs of slots having angular relation to each other while the cam-controlled insertion means operate reciprocally for effecting placement of peg portions each subjected to a predetermined twist just prior to forcing thereof relative to the pairs of slots and also into angular relation to each other in the slots intsantaneously during operation of slot closure mechanism.

A further object of this invention is to provide a stator winding machine means having a winding head portion on which a plurality of gear means are journalled together and rotatable in accordance with movement of a continuous sprocket-driven chain radially inwardly from which a snorkel member with a laterally enlarged axial passage is journalled in geared relation to the chain having an eyelet for guiding coil wire relative to a shoe means supported by the geared snorkel journalled for rotation and positive geared connection simultaneously with movement of the chain in either of reverse directions, the geared snorkel member serving to avoid binding and hindrance in machine winding due to reduction of friction and reaction force against proper following of the snorkel member relative to movement of the chain in a loop path having greater lengths than width.

Another object of this invention is to provide a stator winding machine means having a mechanism to feed insulating material in a continuous strip of insulating material such as paper, plastic-like ribbon and the like severable into slot-closing peg portions, coil separators and the like to be fitted longitudinally in slots and which are formed to conform generally in shape to U-shaped channels, grooves and the like in alignment with blade-like mandrel means resiliently backed by spring means with respect to a head having the channels therein substantially parallel to each other and complementary to the mandrel means which are protected against damage by the spring means.

Further objects and advantages of the present invention will be apparent from the following description, reference being had to the accompanying drawings wherein preferred embodiments of the present invention are clearly shown.

In the drawings:

FIGURE 2 is a detail plan view of portions of mechanism for feeding slot closure means, pegging and the like into a machine-wound stator in conjunction with winding of wire coils.

FIGURE 3 is a side elevational view of mechanism of FIGURE 2.

FIGURE 4 is a top view of mechanism in FIGURE 2 taken in the direction of arrow 4 in FIGURE 3.

FIGURE 5 is a cross-sectioned, elevational view taken along line 5—5 in FIGURE 3.

FIGURE 6 is a cross-sectioned view taken along line 6—6 in FIGURE 5.

FIGURE 7 is a cross-sectioned view taken along line 7—7 in FIGURE 5.

FIGURE 8 is a fragmentary perspective view to show stator slot filling accomplished with the mechanism of FIGURES 1–7.

FIGURE 9 is a cross-sectioned, elevational view similar to that of FIGURE 5 though showing formation of slot closure means, pegging and the like by a portion of mechanism on a stator winding machine means in accordance with the present invention.

FIGURE 10 is a fragmentary, cross-sectioned view of stator winding machine means including a winding head portion that carries a continuous sprocket-driven chain having an eyelet that receives coil wire from a centrally journalled snorkel member that is in geared relation with the sprocket-driven chain and that is elongated for attachment of wire guiding shoe means directly to one end thereof.

FIGURE 11 is a view taken along line 11—11 in FIGURE 10.

FIGURE 12 is a plan view taken in the direction of arrow 12 in FIGURE 10.

FIGURE 13 is a fragmentary sectional view taken longitudinally through the snorkel member in FIGURE 10 and relative to a slotted stator structure.

FIGURE 14 is a plan view of an articulated end portion of wire guide shoe means provided for the stator winding machine means in accordance with the present invention.

FIGURE 15 is an end view taken in the direction of arrow 15 in FIGURE 14.

FIGURE 16 is a diagram to illustrate sequence of operation of mechanism for feeding slot closure means, pegging and the like in accordance with the present invention.

Figure 1:
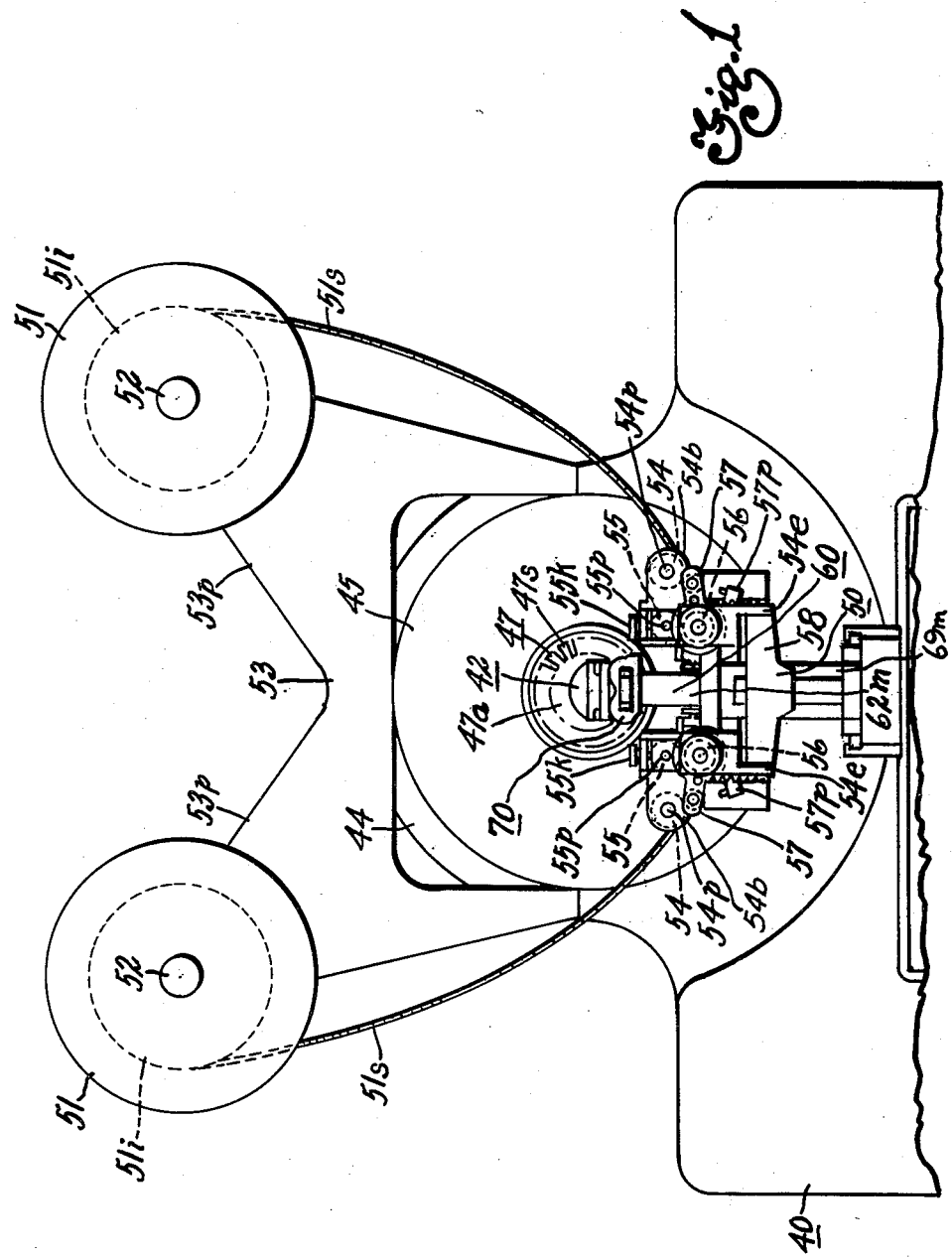
FIGURE 1 is a front, elevational view of a portion of stator winding means in accordance with the present invention.

Dynamoelectric machines generally include a stator having a central annular bore and slots adjacent thereto located angularly relative to each other and radially such that coil wire, insulation separators and slot closing pegs are fitted thereto with considerable time and labor required. The stator winding machine means of this invention facilitates dynamoelectric machine stator component assembly on a mass production basis.

In FIGURE 1, there is illustrated a front elevational view of a portion of stator winding means of the present invention including a base or support portion generally indicated by numeral 40 as well as a winding head portion generally indicated by numeral 42. The base 40 includes a portion 44 and plate 45 which rotatably supports a stator lamination assembly generally indicated by numeral 47 having radial slots 47s therein and a central opening or apertures 47a through which the winding head portion 42 projects. Further details and description as to structural relationship and operation of the winding head portion 42 relative to the support or base 40 and components thereof can be obtained by reference to a co-pending application, Serial Number 692,847—Greene, et al., filed October 28, 1958, now U.S. Patent 2,988,291 issued June 13, 1961, for a stator coil winding machine and belonging to the assignee of the present invention. Modifications and improvements for the previously disclosed machine are set forth herein in accordance with the present invention.

Shown on the stator winding machine means in FIGURE 1, there is a mechanism generally indicated by numeral 50 for feeding slot closure means, pegging and the like into a machine wound stator immediately in conjunction with winding of wire coils into predetermined group. The mechanism 50 includes a pair of reels or storage means indicated individually by reference numeral 51 and rotatably journalled relative to a shaft 52 or other suitable bearing means carried by an auxiliary yoke or support portion 53 having a pair of laterally outwardly extending projections 53p and mounted relative to the base 40 by any suitable means such as bolts or other fastening means not illustrated. Plural coils of insulating material 51i in the form of a continuously wound strip of insulation or plastic treated paper and the like indicated by reference numeral 51s can be supplied from the reels 51 to a roller-cutting portion of the mechanism 50 visible in greater detail in views of FIGURES 2, 3, 4, 5, and 9. This roller-cutter portion includes a plurality of rollers including outer guide rollers 54 journalled by a shaft or pins 54p relative to a bracket or support means 54b extending in opposite directions laterally away from a pair of inner rollers 55 rotatably journalled about shafts or pins 55p located to extend horizontally in a position adjustable vertically as determined by turning knurled members 55k relative to side plates 55s reciprocable in up and down directions relative to a guide or slot 54g formed in part by each of the brackets 54b and a cover portion 54c that serves as a limit or stop governing degree of vertical movement possible. As best visible in FIGURE 3, the rollers 55 are positively connected by way of pins 55p to a toothed gear 55t which meshes with toothed gear means 56t secured to a shaft or pivot 56p relative to lower feed roller means 56 visible in FIGURE 3 and outlined in FIGURES 1 and 2. A bell-crank means 57 including a laterally extending arm portion 57a is adapted to transmit a predetermined rotative force for movement to effect progressive feeding of the strip of insulating material 51s on each side in increments between rollers. A pair of coil springs 57s normally bias the bellcrank means 57 downwardly such that the lateral arm 57a rests against adjustable projections 57p. One end of the springs 57s is hooked into engagement with a pin or dowel-like hook 57h extending from each of the arms 57a and an opposite end of the springs is hooked around an eyelet 57e anchored to a bracket body extension 54e visible in views of FIGURES 1, 2, and 3. Suitable fastening means 57f such as bolts provide an articulated linkage or pivotal connection between the lateral arms 57a and a pair of projections 58p integral with an movable reciprocably in to and fro directions traversed by a cross piece 58 in a path coinciding generally with that of a slot insertion carrier means indicated generally by numeral 60. The slot insertion carrier means 60 includes a head 62 mounted transversely relative to a support member 62m. The cross piece 58 is secured and carried by the movable support member 62m. Thus reciprocal movement of the support member 62m coincides with movement of the cross piece 58 and projections 58p for conversion of linear movement thereof into limited rotary movement as effected by the bellcrank means 57 relative to the rollers 56 and 55. A suitable backlash control indicated by numeral 59 can be added adjacent to the bell crank 57 as indicated in views of FIGURES 3 and 4. The vertical to and fro movement of the support member 62m is governed by a mechanical control including a rear cam 62c that provides a path 62p for a roller, follower pin and the like similar to roller R visible in another cam path illustrated in FIGURE 2 of the drawings. The cam 62c includes a central hub portion splined or keyed to a shaft 89. This shaft 89 is preferably the same as that identified by the same reference numeral in the disclosure of co-pending application, Serial Number 692,847, now Patent 2,988,291 mentioned earlier. Power for driving this shaft 89 is supplied and transmitted in a manner similar to that noted in the earlier filed application and thus no further description thereof is deemed necessary here.

The reciprocal movement of the support member 62m as effected by the cam 62c on shaft 89 is useful not only for the purpose of feeding strips of insulating paper such as 51s but also for cutting or severing a predetermined length of this insulating strip after an end thereof has been fed between rollers 55 and 56. Cutting or severing of a predetermined length of the strip of insulating material 51s is accompanied by downward or return movement of the support member 62m such that a pair of lateral, opposite corners 62c of the head 62 of slot insertion carrier means 60 dove-tails such that the corner 62c telescopes relative to a socket means 40s stationary and fixed relative to the base or support means 40. The socket means 40s provides a cavity 40c into which the corners 62c of head 62 retract relative to a lateral body portion 40b integral or carried by the base or support 40. Cutting or severing of the strip of insulating material 51s occurs simultaneously on opposite sides as best illustrated in FIGURE 5. The corners 62c slidably engage an edge 40e of the socket 40s thereby removing a predetermined portion 51p of the strip of material on each side. Nearly simultaneously with the cutting or severing of the predetermined length 51p of the strip of insulating material, there is a bending of this predetermined portion 51p into a channel-shape due to forming of the predetermined portion 51p over a blade-like mandrel means or projection 64 mounted relative to the socket portion 40s and having an upper end protruding to be complementary relative to slots 65 provided laterally inwardly from the corner 62c in the lower periphery of the head 62. The slots 65 extend longitudinally relative to the head 62 such that the predetermined length of portion 51p of the insulating strip is forced into a C-shaped channel portion 65c of the slots 65 wherein the strip material becomes lodged and anchored against abutting shoulders 65a which prevent removal of the strip material from the channel portion 65c except by shifting of the strip or sliding thereof longitudinally out of one end of the channel portion 65c. It is to be understood that a free end 64e of the mandrel means 64 effects wedging of a strip material portion 51p relative to each channel portion 65c. A plurality of spring means including inner springs 64x concentric with respect to outer spring members 64y all grouped longitudinally in a recess or cavity 64z can be located immediately below each mandrel means 64 as shown in FIGURES 5 and 9. These spring means can total five pairs of concentric springs and members on each side so as to provide strong but resilient backing for each mandrel means so as to avoid damage thereto or to head portions in the event any jam up occurs as to insulation portions 51p. The machine is thus protected to avoid breaking of "die" heads if insulating material should get stuck.

It is to be understood that the head 62 is movable back and forth in a reciprocal path substantially transverse to the support member 62m as governed by a guide portion 62g along an upper end of the support member 62m and adapted to cooperate with a dove-tailing downwardly extending portion 62d of the head 62 secured by fastening means or bolts 62x to portions 62d made separable to facilitate servicing or repair of parts as represented in FIGURES 5 and 9. A pinion or externally toothed gear 66 secured or keyed to a shaft 67 journalled adjacent to or below the guide 62g of the support member 62m is provided together with a somewhat larger gear end 68 as best seen in FIGURE 5. The pinion 66 is adapted to be rotatably moved inside a cavity 66c visible in FIGURES 5 and 6. The pinion 66 has external teeth that mesh with teeth 69t of a bar or rack 69 visible or outlined in FIGURES 3 and 6.

The pinion passes along the teeth 69t of the rack 69 simultaneously as the rack is moved reciprocally in accordance with movement of a support member 69m best seen in FIGURE 3. The support member 69m has an extension 69e relative to which a pivotal means or pin 69p is mounted for journalling the roller R noted earlier with reference to FIGURE 2. The roller R follows a path or guide 69g provided along a periphery or side of a cam 69c visible in both FIGURES 2 and 3 and having a hub portion 69h keyed to splines 89s of shaft 89. Also visible in FIGURE 3, is a roller 62r that follows the cam path 62p mentioned earlier as provided for purposes of to and fro reciprocal movement of the support member 62m. The cam 69c can be referred to as located in front of the rear cam 62c and the shaft 89 is suitably journalled by bearing means 89b relative to an extension 89e integral with the base or support generally indicated by numeral 40. The head 62 also includes a rack portion 62r visible in FIGURES 3 and 7 such that the head 62 is reciprocally movable along guide 62g in to and fro directions substantially transverse to reciprocal movement of the rack 69 relative to pinion 66. Rotation of the pinion 66 as well as externally-toothed gear 68 which is in mesh with the rack 62r of the head 62 effects movement of the head 62 closer to or away from the stator lamination assembly 47 noted earlier. This stator lamination assembly is shown also in FIGURES 3 and 7.

Actuator means generally indicated by numeral 70 are provided on one side of the head 62 in a location opposite to that where the stator lamination 47 is supported. The actuator means includes a mounting bracket 71 secured by a suitable fastener 71f such as a bolt and the like relative to a conduit member 72 having a hollow cylindrical body abutting thereagainst at one end and indicated by numeral 73. Reciprocable inside the cylindrical member 73 there is a piston 74 having sealing means 75 provided therein in a well-known manner. An end 73e of the cylinder 73 is in sealing engagement with the conduit member 72 such that any suitable medium such as hydraulic fluid, gas under compression and the like can be supplied by way of a passage 72p for effecting shifting of the piston 74 in a direction away from the head 62 and stator assembly 47. Simultaneous operation of a pair of pistons 74 in a pair of cylinders 73 included with the actuator means 70 effects longitudinal movement of inserter means or rods 76 attached at one end to each piston 74 and visible in FIGURES 5 and 7 as well as outlined in FIGURE 3. For thin Mylar insulation or paper-like material insertions, these inserter means 76 can have a coined grip or barb on one end to engage portion 61p and travel in paths substantially parallel to each other longitudinally through the channels 65c in dovetail portions 62d with the head 62 so as to push force and slide a channel-shaped peg coil separators of insulating material or slot-closure means identified by P in FIGURES 7 and 8 longitudinally along these channels to a twist contour provided in each channel adjacent to an end or extension 76e integral with the head 62 as visible in FIGURE 4.

Initially the insulator portions 51p as formed in the channels are maintained parallel to each other; but, since the slots are angularly located rather than parallel, it is necessary to impart a twist from the parallel path immediate before portions 51p enter a pair of slots angularly disposed relative to each other. This twist results from having the last surface area of each channel made progressively more angular rather than purely parallel with respect to the other so that momentarily the insulating material of portion 51p is twisted to conform to angular relation of the pair of slots. The inserter means or rods 76 themselves are not twisted but have slight cut outs along edges adjacent to the ends thereof such that each rod or inserter means 76 can travel the full length of the channels 65c. Without any twist with respect to the longitudinal axis of each channel 65c, it would be necessary to have the channels located angularly rather than substantially parallel to each other. Angular relationship of the channels would provide full axial alignment of the channel relative to angularly located slots but would eliminate formation of insulation portions 51p in accordance with the present invention in a single operating mechanism.

There are preferably two of the extensions 76e spaced laterally part and substantially aligned longitudinally relative to a pair of slots such as 47s but spaced axially therefrom so as to laterally maintain positioning of wound end turns of coil wire wound into the slots to a predetermined width such that insertion of insulator portions 51p as coil separators or slot closure pegs can be efficiently and neatly effected without interference by any drifting or displaced coil wire loop. The twist-contour ends of the channels 65c are directly in alignment longitudinally, annularly and axially relative to these slots 47s in pairs relative to which coil wire 47w has been machine wound with end turn portions 47e of the coil wire purojecting laterally to one side of the stator lamination assembly 47. Prior to beginning of the machine winding of coil wire 47w into the slots 47s each of the slots is fitted with a slot liner such as indicated by L and having a generally C-shaped configuration extending longitudinally to form a channel for receiving the coil wire.

The predetermined length for portion 51p of the insulating strip 51s as cut therefrom by the corners 62c sliding relative to edge 40e, permits the end 64e of the mandrel means 64 to form the coil separator, channel-shaped, a slot closure means for peg P and the like relative to channel 65c as best seen in the view of FIGURE 9. After formation of the peg or slot closing means during retraction of the head 62 laterally away from the stator assembly 47 as well as downwardly away from head portion 42, the pegs are formed in pairs in the channels 65c ready for realignment with the inserter means 76 as well as slots 47s. It is to be understood that supply of a pressure transmitting medium such as air under pressure, hydraulic fluid and the like through the passage 72p effects retraction of the inserter means 76 laterally to one side of the support member 62m away from the stator assembly 47. A suitable flexible conduit 72c visible in FIGURE 3 is provided to establish communication from a suitable source of pressurized air or fluid medium for passage thereof relative to the conduit plate 72 having passage 72p therein. Another conduit 76r is adapted to establish communication through a suitable passage relative to space with respect to a pressure chamber 76c inside the cylinder 73 of the actuator means 70 such that the piston 74 together with the inserter means 76 can be moved under force transmitted by the fluid pressure medium relative to the inserter means 76 such that a slot closure means for peg P is slidably moved or shifted longitudinally relative to the channel 65c through the extension 76e directly into closing relationship relative to an open end of a slot such as 47s in the stator assembly 47.

It is to be understood that the anti-backlash means 59 can be provided in any suitable form for example the device can comprise a one way clutch whereby the bellcrank arm 57a on each side or for each of the pair of slots can effect turning of the feeding rollers 55 and 56 only in one direction so as to effect positive advance of the strip of insulating material 51s. The rollers 54 act only as idlers relative to the gear-driven interconnected rollers 55 and 56. Also, it is to be noted that a pin 67p is inserted transversely through one end of shaft 67 for retention of gear 68 and pinion 66 relative to support member 62m. This relationship of structure is best seen in FIGURE 5.

To assure proper supply of the strip of insulating material 51s, the roller-cutter portion is further provided with a guide plate 40x on each side of the socket member 40s as visible in FIGURES 2 and 5. It is further noted that the channel 65c in the head 62 relative to which predetermined lengths of this strip of insulating material are formed by action of the ends 64e of the mandrel means 64 have a generally trapezoidal or keystone-like shape such that the channel forms the predetermined length of material into a substantially U-shaped peg P. The slot closure means for peg P fits relative to the stator assembly 47 as best seen in a fragmentary enlarged view of FIGURE 8. FIGURE 7 shows one of a pair of pegs or projections 76p extending downwardly from the end 76e such that coil wire 47w in the end turn portion 47e is pushed laterally to one side of the inserter means 76 as well as being held laterally against shifting and spreading out of alignment with the head 62. The mechanism 60 can be generally referred to as a feeder that moves in and out laterally as governed by the front in and out cam 69c identified in views of FIGURES 2 and 3 and also referred to in a diagram of FIGURE 16 that illustrates the sequence of operation of mechanism for feeding the slot closure means, pegging and the like in accordance with the present invention. This diagram of FIGURE 16 will be referred to in a summary of operation later in the specification. This diagram also identifies function of the cams 69c and 62c relative to each other and relative to degrees of rotation of the shaft 89.

In addition to the projections 76p which engage opposite, outside lateral portions of the end turns 47e of coil wire as indicated in FIGURES 3, 4, and 7 there is provided a rod-like hooked-end "woodpecker" means generally indicated by numeral 80 and visible in views of FIGURES 3 and 4. This "woodpecker" means includes a rod 81 pivotally secured at one end 81e to a crank 81c which is moveable about an arcuate path relative to an axis of a shaft 81s. This shaft 81s is powered by a suitable motor means 81m. The motor means 81m can be electrically powered as well as powered by a fluid medium such as a gaseous medium under compression or even hydraulic fluid supplied under pressure by way of a tube 81t as indicated in FIGURE 3. The rod 81 is fulcrumed and is slidable relative to a fulcrum means or eyelet 81f which is pivotally supported by a pin 81p carried by a bracket 81b secured by fastening means such as screws S relative to a joining support plate 81j which serves to position the bracket 81b and motor means 81m in a predetermined relationship to each other. This joining plate 81j is laterally adjustable in position relative to a flange member 81k suitably fastened such as by bolts to the base or support means 40. The joining plate 81j is adapted to be fixed in a predetermined position relative to slots 81i in a lateral portion of the flange means 81k relative to which suitable fasteners or gripping means such as set screws 81g are provided for fastening of the "woodpecker" means 80 in a predetermined position relative to the base or support 40 relative to which the stator assembly 47 is also located in a predetermined position.

The "woodpecker" means 80 includes a bifurcated and doubled hooked end portion 84 visible in FIGURES 3 and 4. A pair of hook ends 84h can move vertically as well as laterally in accordance with movement transmitted to one end 81e by the crank 81c whenever the shaft 81s is caused to rotate a predetermined arcuate distance. For example, one complete rotation of the shaft 81s effects a 360° turning of the crank 81c which is keyed or fastened to an end of the shaft by a set screw and the like. Preferably the end of the shaft 81s terminates substantially flush with the crank 81c such that the end 81e held to a radially outer end of the crank 81c by a cotter pin and the like can rotate in repeated cycles in an arcuate path substantially concentric relative to the shaft 81s. Due to the fulcruming provided by the eyelet 81f, it is apparent that the rod 81 will cause the end portion 84 and hooks 84h to traverse a path governed or controlled by the bellcrank 81c. Movement of the bellcrank 81c in a downward direction effects lowering of the end portion 84 while upward movement results in raising of the end portion 84. Passage of the end 81e to the right as seen in FIGURE 3 will result in retraction of the end portion 84 from the end turns 47e of coil wire while movement in a leftward direction results in a pivoting inwardly by the end portion 84 relative to the end turns 47e so as to engage as well as pull the coil wire of the end turn laterally outwardly away from the projection 76p and inserter or feeder means 76 so as to obviate obstruction to passage of the slot closure means or pegs P relative to slots of the stator assembly 47. Operation of the motor means 81m is controlled by a suitable means forming no part of the present invention. A control drum for such a purpose including electric switches actuated periodically during a predetermined cycle operation can be provided as noted in the co-pending application referred to earlier. It is to be noted that an advantage of the movement of end 81e in an arcuate path for fulcruming the rod 81 along a mid portion thereof is utilized particularly because, when the end 81e is near a top portion of its path, the hooked ends 84h extend substantially parallel to end turns 47e of the coil wire previously wound relative to slots of the stator assembly 47. While the end 81e is in a lower left quadrant as viewed in FIGURE 3, the rod 81 will be substantially vertical in position or substantially parallel laterally relative to the stator assembly 47 such that the hooked ends 84h positively engage and pull the end turns 47e laterally away from the bifurcated extensions 76e. The "woodpecker" means in effect serve as a holding device operative for facilitating insertion of the slot closure means or pegging P relative to the stator assembly 47.

To assure against longitudinal displacement of slot liners L as well as possible tearing or damaging of the insulating material of these liners, by coil wire during machine winding the winding head portion 42 as shown in FIGURE 13 is fitted with two pairs of laterally spaced projecting portions generally indicated by numeral 90. These projecting portions are provided to assure end protection for the slot liners L during machine winding of coil wire 47w relative to slots 47s though the projecting portions 90 are retracted and moved with winding head portion 42 away from the slot liners L during insertion of the coil separators, slot closure means or pegs P relative to partially-filled or fully-filled slots, respectively. It is to be understood that the head 62 is indexed into position immediately adjacent to the lamination assembly 47 during slot closure means insertion. However, the head 62 of the feeder mechanism 60 is retracted and located away from the lamination assembly 47 during the actual winding of coil wire into the slots. Upon completion of the winding operation, the winding head 42 is shifted or indexed away from aligned engagement with an inner periphery of the stator assembly 47 such that the projecting portions 90 are no longer located in pairs adjacent to slot liner ends on each of opposite sides of the stator assembly. Fastening means such as screws 90s hold the projecting means 90 relative to a channel-like frame 92 having a laterally inwardly curved pair of end portions 92e which terminate adjacent to slots 92s adapted to be longitudinally aligned with the stators slots 47s. The slots 92s are formed both by the end portions 92e and a central segment 94 of a guide shoe means generally indicated by numeral 96 as visible in FIGURES 10 and 13. Key means 94k are fitted in dual pairs to this central segment 94 and extend radially into a pair of adjacent slots as indicated in FIGURES 10 and 13 such that the winding head portion 42 is in proper aligned relationship with respect to the stator assembly 47. During maintenance of this proper alignment, the projecting means 90 are so positioned that ends or extensions 90e thereof are located axially adjacent to end portions of the slot liners L extending laterally beyond ends of the slots 47s though they need never contact the slot liners directly so as to back or push them. Thus coil wire 47w is machine-wound relative to slots 47s in at least one and usually three layers of coils or groups of coils. Coil separators can be supplied between layers of coils by use of feeder mechanism 60 also. Projecting means 90 hold down previously wound wire during winding of subsequent coils. Projections 76 on head 62 serve a similar purpose during engagement thereof relative to coil end turns. After filling of the slots, the slot closure means or pegs P are ejected from the channel 65c. Optionally, a deflector or rod means 91, diagramatically shown in FIGURE 8, can be provided to effect limited displacement of one side of a slot liner laterally inwardly as represented such that the slot closure means or peg P straddles the coil wire 47w as well as one side of the slot liner L. A pneumatic or hydraulic actuator 91a having a piston 91p biased by spring 91r for return to a predetermined position is adapted to actuate rod 91. Rod 91 itself can be resiliently backed by relatively stiff spring 91s provided to avoid damage due to jamming. Thus the one end of the peg P can be fitted inside the slot liner L and an opposite end can be forced outside the slot liner as indicated in FIGURE 8 due to deflection of one side of the slot liner by rod 91. It is to be noted that this particular method of the insertion of the slot closure means or pegs is used when slot fill of coil wire is such that tight fit of slot closing means can be better obtained by using part thereof to augment slot filling. Generally, however, the slot closure means are fitted wholly inside the slot liners and no additional tightness or locking to assure against looseness thereof is needed.

For guiding and placement of wire relative to the slots 47s, the winding head portion 42 includes a rotatably journalled snorkel member generally indicated by numeral 98 and located centrally inside a chain generally indicated by numeral 100. This chain 100 is power driven in a manner similar to that described in the co-pending application referred to earlier. The chain fits peripherally relative to sprockets 101 and 102 as indicated in FIGURES 10 and 11. A secondary chain 104 is provided to drive sprocket 102 by way of intermediate sprockets 105, 106, and 107 visible in FIGURES 10 and 12 and described in greater detail in the co-pending application. It is to be understood that in place of a direct connection by means of a journalled shaft 105s between sprockets 105 and 102, it is sometimes desirable to divide the shaft 105s into separate parts laterally off-set from each other and provided with a pair of meshing gears for power transmission from the spline shaft 174 identified in FIGURE 10 and referred to in the co-pending application. Such an intermediate gear connected so as to permit lateral off-setting of portions of the shaft 104s provide increased freedom for movement of the winding head portion 42 relative to a central opening or aperture 47a of the stator assembly 47. Sometimes the base or stationary structure including the portion 45 for mounting of the stator assembly is such that the sprocket 105 is preferably moved laterally to one side away from the location of the stator assembly relative to the winding machine means.

Coil wire 47w is fed through a funnel portion 98f of the snorkel member 98 and into a longitudinally or axially extending passage 98p visible in FIGURES 10, 11 and 13. This passage 98p terminates at its lower end in a laterally and arcuately enlarged opening or end guide portion 98e such that the coil wire 47w can pass efficiently to an eyelet 100e having a passage 100p therein which is caused to move in a path longer than it is wide in accordance with movement of the chain 100 relative to the sprockets 101 and 102. This eyelet 100e passes in a loop periphery around the guide shoe means 96 including a pair of end portions or segments 96e fastened by suitable means such as bolts 96b directly in engagement with opposite ends of the central segment 94 mentioned earlier. The guide shoe means 96 is supported relative to the winding head portion 42 only by means of a shaft-like portion 98s integral with the snorkel member 98. A retaining ring 98r is press fitted or held to this shaft-like portion 98s by pinning over the end thereof or other suitable fastening means. Suitable roller bearing or ball bearing means are provided relative to the snorkel member 98 both respect to the intermediate member or segment 94 as well as a mounting bracket 42b adapted to straddle the frame 92 and to provide journalling support for the snorkel member 98 relative to the winding head portion 42. This bracket 42b can be seen in views of FIGURES 10, 12 and 13 and includes multiple slots 42s such that suitable fastening means 42f can be loosened and tightened for adjustably positioning the bracket and snorkel member 98 longitudinally relative to the frame 92 of the winding head portion 42. These fastening means can be in the form of set screws and the like.

In the embodiment of the present invention, the snorkel member 98 is gear driven by means of a power take off connected with the sprocket 101. As best seen in FIGURE 10, the sprocket 101 is secured by a key 101k to a shaft 101s journalled by suitable bearing means relative to the bracket 42b, frame 92 and the like such that an upper end of the shaft 101s has a pinion gear 110 secured thereto by a key 110k and the like. A compound gear 112 is journalled having a main power takeoff meshing portion 112m engaging the pinion gear 110 such that power is transferred to a smaller and lower gear portion 112s thereof for transmitting driving force to idler gears 113 and 114 journalled as shown in FIGURE 10. The last mentioned idler gear 114 meshes with a sprocket gear portion 98g which is keyed, press fitted or otherwise suitably attached to effect rotation of the snorkel member 98. Due to the gear train connection between spocket 101 and the snorkel member 98, there is one complete revolution of the snorkel member 98 for every complete revolution of the eyelet 100e in the path of the chain 100. Gear-connection of the snorkel member 98 provides positive inter-connection of the means used to guide and feed the coil wire 47w into the stator slots 47s so far as the winding head portion 42 is concerned. Movement of the chain and snorkel member coincides in either of reverse directions and the geared snorkel member 98 serves to avoid binding and hindrance in machine winding due to reduction of friction of the coil wire relative to the snorkel member 98 and eyelet 100e. There is also an appreciable reduction in the difference in reaction force opposing movement of the coil wire 47w through the passage 98p and extended opening 98e of the snorkel member 98 such that smoother operation is obtained together with more accurate machine winding of the coil wire 47w relative to the slots 47s of the stator assembly.

It is to be understood that during the winding operation of the chain and snorkel member, the insulation feeding mechanism is retracted away from the stator assembly 47. As the head 62 of the mechanism 60 is moved laterally inwardly to a position adjacent to the stator assembly, the head 62 is slightly above the end turns 47e for a sufficient distance to assure clearing thereof during lateral movement. Upon reaching a location adjacent to the stator assembly 47, the head 62 together with the extensions 76e are lowered slightly into operative engagement relative to the end turn and adjacent to the stator assembly.

Preferably, during winding of the coil wire into slots 47s, the rate of travel by the geared chain and snorkel member combination is such that a rate of winding anywhere in a range between 100 and 2000 turns per minute and the like, more and less, can be attained in winding the stator assembly. Over-all high speed operation of the winding machine means is particularly important on stator assemblies having a fewer number of turns of wire in coils. By use of plastic resin insulation coating for the coil wire 47w, it is possible to fill a maximum number of turns into a predetermined slot in a minimum time by using the stator coil winding means in accordance with the present invention. Preferably, upon completion of each coil or group of coils, the eyelet 100e stops adjacent to a side of the lamination assembly opposite to the side upon which the insulation feeding mechanism is located. As described in the co-pending application, the position for stopping after winding one coil, is the starting position for winding of a subsequent coil subject to either long or short indexing movement in an arcuate path.

It is also noted that the control for operation of the main driving motor or source of power for effecting movement of the chain 100 can be electronically as well as mechanically determined. In the event a mechanical gear reduction is used in place of an electronic control, it is preferred that a two-speed gear reduction be provided in a suitable gear box such that differing rates of operation can be used for running at high speed during a major portion of the winding operation and a slightly lower "approach" speed can be provided during slow down upon completion of winding for a particular stator coil. Preferably dual clutches and brakes are provided such that with the gear box, the winding can proceed at a relatively high rate of operation without appreciable slow down until within approximately two turns from a stop position whereas with electronic control, it is generally necessary to begin operation at a reduced speed or rate within five and one-half turns away from a final stop position. The machine means in accordance with the present invention can be used to wind coils for two, four and more electrical poles relative to stator assemblies having deep or shallow slots and relative to round as well as square laminations with a minimum of slow down in operation and gain in time at minimum cost of assembly due to speed of operation.

In addition to the geared snorkel member 98 to facilitate placement of coil wire 47w relative to the slots of the stator assembly, the embodiment of the present invention provides an improved pair of end portions or sectors 96e shown in FIGURE 10 and illustrated in individual views in FIGURES 14 and 15. These end portions 96e can be as shown in the co-pending application or can include improved features illustrated in the views of FIGURES 14 and 15 in which an end portion is identified generally by reference numeral 120. Preferably, this end portion structure 120 includes an upper shell-like means 120m including laterally and longitudinally extending guide sections 120s on opposite sides thereof the guide sections merge in a nose portion 120n at one end and terminate at an opposite end in a cutout 120c formed as a pocket, recess and the like for retention of grouped end turn coil wire at a location immediately adjacent to and in between the stator structure and guide sections.

It is to be noted that insulation feeding mechanism 60 can be used to insert coil separators as well as slot closure means or even rope-like pegs preformed depending upon the shape of the channels 65c as well as the configuration of the strip of insulating material per se.

FIGURE 16 is a diagram which illustrates the movement of the mechanism 60 including the feeder head 62 and components thereof for in and out movement relative to a stator assembly as well as the up and down movement thereof with respect to the cams 69c and 62c. As indicated earlier, the cam 69c governs movement of the feeder or head 62 laterally inwardly toward the stator assembly, and it is to be understood that the cam 69c is inoperative during actual insulation insertion of slot closure means or pegs relative to an open end of slots 47s. Cam 69c also controls laterally outward movement of the feeder or head 62 away from the stator assembly 47. Cam 62c controls the rise of the feeder to a position substantially horizontally in alignment with the stator assembly and then while the cam 69c is inoperative, the cam 62c effects lowering or dropping of the feeder or head 62 to a position accurately in alignment with the predetermined pair of slots relative to which the inserter means or rods 76 force the slot closure means or pegs. Suitable electric switches can be provided to operate solenoid valves in the event a gaseous or fluid medium under pressure are provided for movement of pistons inside cylinders as mentioned earlier. Upon completion of the insertion of insulating material into the open ends of the slots, the feeder or head 62 is retracted away from the stator assembly and subsequently the cam 62c permits the feeder or head 62 to drop so as to effect a cut-off of a predetermined length of the insulating strip together with formation of a peg or channel-like slot closure means relative to the mandrels 64 as indicated previously. The insulating strip of material advances between the rollers 55 and 56 during the up-stroke of the head 62 and the cutting operation occurs during the downstroke of the head. It is to be noted that optionally additional insulating strips can be provided in intermediate locations and extending longitudinally through the slots when partially filled with coil wire 47w so as to effect proper filling and separation of certain groups or coil elements from each other when necessary. In such events, it is often customary to insert H-shaped insulating pieces as well as U-shaped pieces and the like and then continue with machine winding of the wire coils in one or more stator winding machines adapted to wind a predetermined number of turns relative to a specific arrangement of coils in a stator assembly. In any event, the insulation feeding and inserting mechanism 60 in accordance with the present invention, can be used for purposes of closing off the open end of each of the slots 47s. Improved running and approach control of speed so far as positioning of the winding head 42 is concerned relative to the stator slots can be obtained by using a gear box together with a pair of clutches and brakes relative to a two-speed transmission as mentioned earlier. Preferably, an insulating coating in a single layer is provided on the coil wire 47w and such insulation is commercially available under a name Mylar which is a polyester film obtained from a polymer synthesized from petroleum derivatives also called polyethylene terephthalate. Also, an insulation system of acrylic which is a fiber-forming substance of any long chain synthetic polymer composed of at least 85% by weight of acrylonitrile resin units can be used wherein wiring can have insulating fibers thereon of Dacron which is a fiber-forming polyester material composed of a polymer of terephthalic acid and a dihydric alcohol. Cotton fiber covering for wiring can also be used. Other suitable commercially available wire insulation coatings such as Formvar which is a polyvinyl formal material as noted in Patents 3,067,063 and Re. 20,430, Analac which is polyester or polyurethane type material, and polyester resin materials and the like can also be provided on coil wire placed into predetermined slots of a stator assembly by use of stator winding machine winding machine means in accordance with the present invention. Where tapped coils are fitted into stator slots by machine windings, the insulation feeding mechanism 60 can insert coil separators in predetermined sequence such that on the first coil wound, separators are inserted on each side of a loop; on the second coil wound, there can be a separator inserted on one side and a peg or slot closing means on a finished side or where the slot is filled; and on the third coil wound, pegs or slot closing means are inserted on both sides. It is to be understood that insulation inserted by mechanism 60 is identified as a separator or peg depending upon the purpose thereof in the stator. Operation as covered in the specification and claims with respect to mechanism 60 applies both to separators as well as pegs or slot closing means which terms are used interchangeably herein. The present invention permits machine winding of tapped main and phase windings rather than concentric windings.

While the embodiments of the present invention constitute preferred forms, it is to be understood that other forms might be adopted.

What is claimed is as follows:

1. For use on stator coil winding machine means adapted to effect placement of coil wire into radially extending slots of dynamoelectric structure, mechanism for feeding insulating material as slot-closure means, pegging and the like into the slots previously fitted with coil wire therein, comprising, a head reciprocally movable into and out of a position adjacent to the radially slotted structure continuously supported on the coil winding machine means and having a channel extending longitudinally therein to an open end with a predetermined twist on sides thereof to be in alignment with at least one of the slots, a feeder rod means reciprocable in the channel for transfer of insulating material to the slot, and actuator means carried by said head such that operation thereof can effect movement of said feeder rod means for forcing the insulating material along said twist sides to facilitate transfer thereof to the slot as well as retracting movement of the feeder rod means away from the slot.

2. On a stator coil winding machine means adapted to effect placement of coil wire into arcuately-disposed radially-extending slots of dynamoelectric machine structure, mechanism for feeding insulating material as slot closure means, pegging and the like into the slots, comprising, a pair of complementary reel-like storage means each for a continuous strip of the insulating material and supported by the machine means, feed roller means through which the strip is supplied in a flat condition, a head slidably mounted relative to the machine means and adapted to be moved back and forth relative to dynamoelectric machine structure which is carried continually in a predetermined location on the machine means, said head including a pair of substantially parallel channels terminating in twist sides, socket means attached to the machine means in a location complementary to said head channels and having at least one cutter edge located substantially transversely though in alignment with a path of movement of the insulating strip by way of said feed roller means, at least one cutting corner portion on said head and adapted to complement said cutter edge for severance of a predetermined length of the flat insulating strip simultaneously with movement of said head in one direction so as to effect instantaneous channelling as well as temporary retention of the predetermined lengths by said head in said parallel channels thereof, feeder-insertion means reciprocably movable relative to the head in a path coinciding with said channels except for transfer of the predetermined lengths of insulating strip instantaneously in final engagement with said twist sides to facilitate fitting thereof into slot-closing position relative to the dynamoelectric machine structure having the slots arcuately out of line with said generally parallel channels except for said twist sides which provide smooth aligning transition into the slots.

3. The mechanism of claim 2 wherein said head includes a pair of cutting corner portions to complement a pair of cutter edges as provided by the socket means, said head further having a pair of substantially parallel open entry slots that terminate in substantially parallel U-shaped channels for forming and retention of the predetermined length of strip, a pair of blade-like mandrel means mounted substantially in alignment with the open entry slots and the channels for formation of channel-shaped slot closing means out of the predetermined length of strip subsequent to severance thereof, and end projections on said head adapted to fit adjacent to end turns of coil wire placed into the slotted structure as well as to serve as a guide thereto when said feeder-insertion means shift the predetermined lengths of strip longitudinally out of the channels along said twist sides at ends thereof into the slotted structure.

4. The mechanism of claim 2 wherein at least a pair of said feed roller means are geared together, a bellcrank means movable in response to shifting of said head away from said cutter edge and adapted to translate the shifting movement into limited one-way rotation of said geared feed roller means for supply of a subsequently needed predetermined length of insulating strip for slot closure means that is cut by said corner portion of said head upon return movement thereof.

5. A mechanism for feeding insulating material as slot closure means, pegging and the like into slots of a dynamoelectric machine stator structure supported in a coil wire placement position on a stator winding machine means, comprising, a head carried in a location axially adjacent to the stator structure and adapted for movement substantially transversely of as well as also reciprocably slidable on a shiftable support member for said head, said support member being shiftable radially adjacent to said stator structure supported by the winding machine means, a feed-roller means geared for limited rotation in response to shifting of said support member toward the stator structure, cutter means cooperable with said head for severance of insulating material in a location adjacent to said feed-roller means such that predetermined lengths of insulating strip material can be cut off, said head having insulation-forming channel means opened at opposite longitudinally separated ends and opened laterally to one side of said head for receipt of the predetermined lengths of strip material formed thereby into a substantially U-shape, and rod-like feeder inserter means movable longitudinally through the channel means to effect transfer of the strip material for slot closure in the stator structure.

6. The mechanism of claim 5 wherein said support member is cam-controlled for movement by a first cam means actuated upon completion of machine wound placement of coil wire into a predetermined pair of stator slots, said head being movable laterally to and fro as carried substantially transversely relative to said support member as well as up and down therewith, a geared rack movable by second cam means operable independently of said first cam means and located reciprocably substantially parallel to said support member, a two-part gear means journalled in said head and having one part in meshing relation to said geared rack, a rack portion provided with said head and meshing with the remaining geared-part of said two-part gear means so as to translate arcuate movement of the second cam means into transverse action of said head toward as well as away from said stator structure.

7. The mechanism of claim 5 wherein said support member has a transverse guide portion adjacent to an upper end thereof, and a dovetailing slide portion provided on said head complementary to said guide portion, the channel means having a location substantially parallel to said guide and slide portions.

8. The mechanism of claim 1 wherein an end of said channel has said twist sides adjacent to the slot which becomes generally longitudinally aligned with the channel though angularly positioned to be offset in contour with respect to the channel and said channel end is contoured to impart the predetermined twist for predetermined smooth transfer of insulating material as a coil separator, slot closure means and the like from the channel into the slot.

9. A stator winding machine means for filling slots of a lamination assembly having slot insulation with both coil wire and slot closure means to be added thereto, comprising, a base having a portion to support the slotted lamination assembly in selectable positioning about an axis of the slotted lamination assembly, a winding head portion carried by said base and including a laterally projecting frame-like body extending in cantilever relation such that the lamination assembly can be placed as well as removed relative to one end thereof, a continuous chain having an eyelet portion carried thereby in a loop path longitudinally through a central opening of the lamination assembly, a wire feeding snorkel member journalled and supported also by said body so as to be movable about its axis in a location surrounded by said chain, a positive driving connection means between said snorkel member and said chain, a rod-like hooked end member pivotally as well as reciprocally mounted relative to said base and provided for engaging coil end turns so as to keep wire thereof spread laterally outwardly and anchored against shifting as well as possible interference during insertion of slot closure means, said winding head portion having a pair of projections on each side thereof for shielding the slot insulation protected thereby against shifting as well as possible damage such as tearing and the like, and a reciprocally movable feeder head including an inserter portion to effect transfer of slot closing means over coil wire while the wire is being engaged by said rod-like hooked end member as well as while said winding head projections shield the slot insulation.

10. The machine means of claim 9 wherein said feeder head has a pair of substantially parallel U-shaped channels longitudinally alignable with corresponding slots extending radially and arcuately spaced in the lamination assembly, and twist sides adjacent to one end of each of the channels for contoured transition from parallel to radially and arcuately spaced positioning of the slot closure means to complement slot fill.

References Cited in the file of this patent
UNITED STATES PATENTS

| | | |
|---|---|---|
| 1,721,037 | Poole | July 16, 1929 |
| 2,340,291 | Wirtz | Feb. 1, 1944 |
| 2,492,911 | Williams | Dec. 27, 1949 |
| 2,627,379 | Moore | Feb. 3, 1953 |
| 2,772,701 | Brune | Dec. 4, 1956 |
| 2,808,640 | Biddison | Oct. 8, 1957 |
| 2,835,372 | Biddison | May 20, 1958 |